March 16, 1971 A. F. A. BARTELS 3,570,047
METHOD FOR THE REMOVAL OF THE LIVER FROM THE BELLY CAVITY
OF FISHES, IN PARTICULAR LEAN FISHES
Filed Sept. 12, 1968 3 Sheets-Sheet 2

INVENTOR:
A. F. A. Bartels
BY
Richards & Geier
ATTORNEYS

United States Patent Office 3,570,047
Patented Mar. 16, 1971

3,570,047
METHOD FOR THE REMOVAL OF THE LIVER FROM THE BELLY CAVITY OF FISHES, IN PARTICULAR LEAN FISHES
Alfred Friedrich Adolf Bartels, Lubeck-Israelsdorf, Germany, assignor to Nordischer Maschinenbau Rud. Baader Lubeck, Germany
Filed Sept. 12, 1968, Ser. No. 759,290
Claims priority, application Germany, Sept. 19, 1967, P 16 54 998.7
Int. Cl. A22c 25/14
U.S. Cl. 17—45    5 Claims

ABSTRACT OF THE DISCLOSURE

A method and apparatus for the removal of liver and gullet from the belly cavity of fishes include means engaging the liver lobes from behind, from the gill cavity, below the spine and on both sides of the gullet, whereupon the ligaments supporting the liver lobes are severed by stripping along the interior wall of the belly cavity. The gullet is clamped and torn out during the severance of the ligaments.

---

Figure 1:
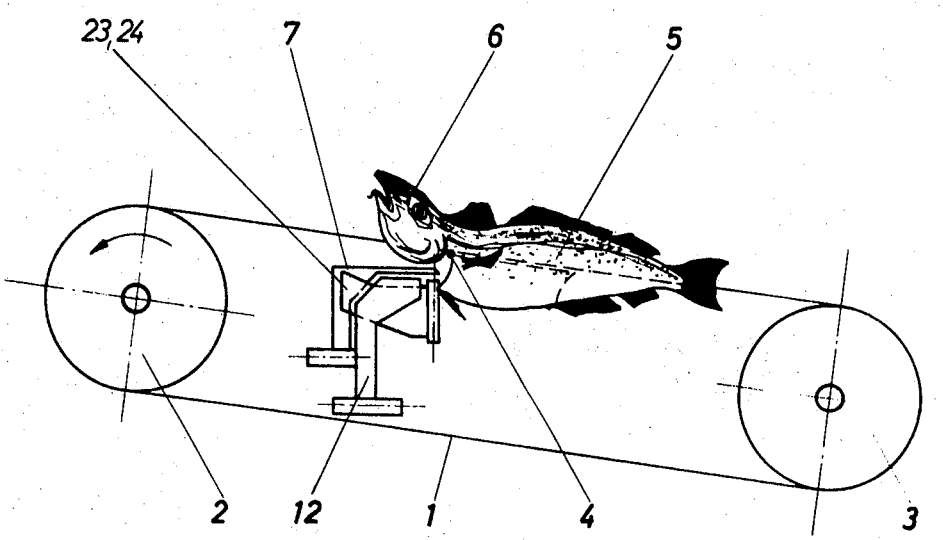

This invention relates to a method and apparatus for the removal of the liver from the belly cavity of fishes, in particular lean fishes, its object being an improvement of the mechanised gutting procedure.

The liver, particularly of lean fishes, is a very valuable product which is obtained in gutting and is processed into preserved liver or into liver oil owing to its high vitamin content. Up to the present time liver was obtained by manual tearing out when fishes are gutted on board ship.

The prior art discloses a cleaning and gutting machine in which the guts of the fish, conveyed head leading, belly facing downward, drop downwardly after the belly cavity is cut open. This machine is provided with a liver ejector adapted to sever the liver from the belly flap by means of a pair of circular knives, disposed at a distance from each other and having serrated discs on their interior, in order to tear the liver out of the belly cavity.

This arrangement was unsuccessful because severance of the ligaments and skins supporting the liver in fishes of different size could not be achieved with reliability while on the other hand it was not possible to avoid damaging the sensitive liver tissue by the circular knives and serrated discs.

The object of the invention is the elimination of these defects and disadvantages by removing the liver mechanically from the belly cavity, independently of the size and kind of the appropriate fish but while substantially protecting the liver and where appropriate by simultaneously tearing out the gullet.

According to the invention the problem is solved in that the liver lobes are engaged from behind, from the gill cavity, below the spine and on both sides of the gullet, and the ligaments supporting the liver lobes are severed by stripping along the interior wall of the belly cavity. This method is simple and protects the liver to be detached since the severing operation takes place directly on the wall of the belly cavity, that is to say at the maximum possible distance from the organ. It is advantageous to apply the thrust to the belly flaps from the exterior during the stripping operation in order to ensure in all cases that the connecting ligaments are severed directly on the belly cavity wall.

An advantageous embodiment of the method provides for detachment of the liver with simultaneous removal of the gullet, a procedure which is performed according to the invention in that the gullet is clampingly gripped after the liver lobes have been engaged from behind and said gullet being torn out during severance of the ligaments which support the liver. This represents a simplification and reduction of the processing steps to be performed in the cleaning of fishes and provides a substantial saving of time.

The method can of course be performed on fishes prepared in different manners. For example, in fishes whose belly cavity is opened only in the gill zone, the stripping and tearing motion for liver and gullet will take place preferably in the direction of the gill cavity of the fish, while in fishes whose belly cavity is opened over their entire length, that is to say as far as the anus, the entire movements are performed in the direction of the lower belly edge and tail end of the fish.

Special advantages of the method according to the invention and all its variations include the complete obtaining and undamaged preservation of the liver lobes in the fish while on the other hand the durability of the gutted fish is prolonged if all entrails are removed therefrom without any residues remaining therein. This complete and reliable removal is therefore an essential prerequisite for the products to be obtained subsequently from the fish.

Apparatus which has a conveyor for conveyingly gripping the fish by the head or in its gill cavity and having liver severing means have been found most advantageous for performing the method according to the invention. In a preferred embodiment the liver severing means comprise two members co-operating in the manner of grippers of which one forms a liver stripper comprising two spiked gripper limbs having gullet grippers and stripper zones, a separate bearing system and synchronous coupling, while the second functions as thrust members having thrust surfaces with separate bearings and synchronous coupling. This system is of relatively simple design and its operation requires little effort while at the same time ensuring reliable and rapid performance of the method.

In order to ensure reliable severance of the ligaments supporting the liver and to avoid damage to the liver in all cases, the liver severance apparatus is provided with an additional spreader disposed between the liver stripper and the thrust member, said spreader comprising two deflector plates pivotable about a common axis, the stripper surfaces of the liver stripper being inclined at an outward angle so that they perform a shearing action in cooperation with the edges of the deflector plates. In order to render the shearing operation uniform and reliable it may be advantageous to pull the deflector plates towards each other by means of a tension spring but it is equally feasible to maintain them under stress by thrust applied from the exterior or in some other suitable manner. For reasons of design simplicity the pivoting axis of the deflector plates is preferably disposed in the plane of symmetry of the fish perpendicularly to the conveying direction.

Figure 2:
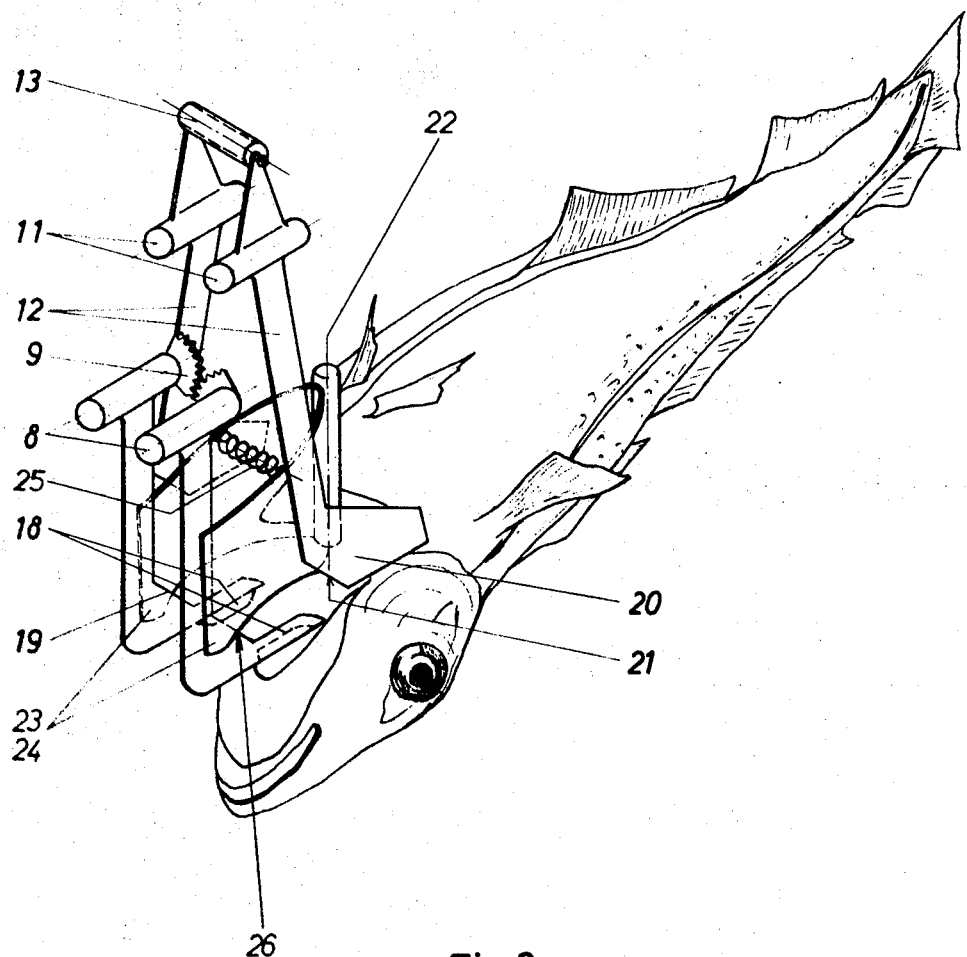
Figures 3, 4, 5:
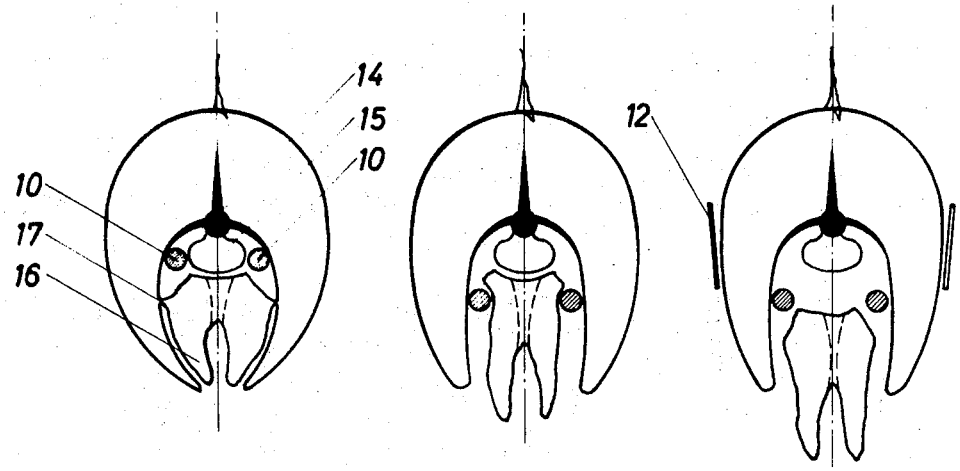
Figures 6, 7, 8:
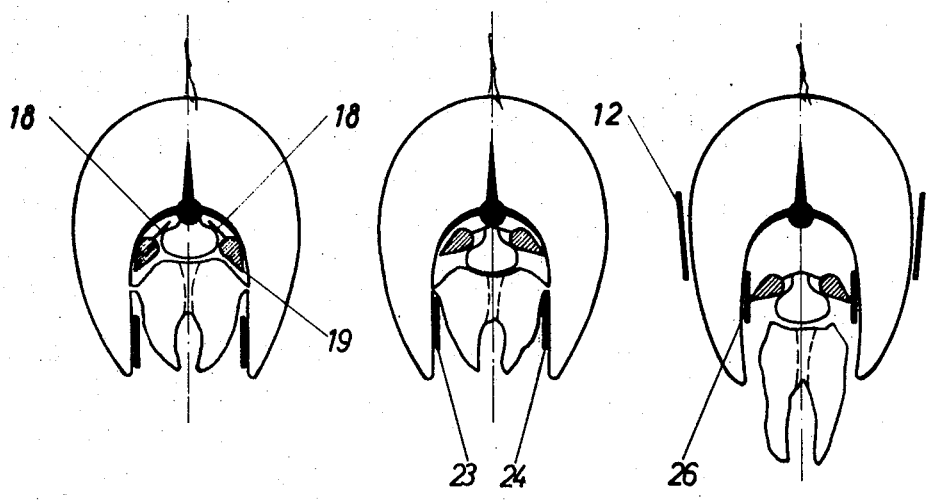

The invention will now be explained by reference to the diagrammatic drawing in which:

FIG. 1 is a side view of apparatus suitable for performing the method,

FIG. 2 is a perspective view of the position of a tool for performing the method shortly before penetrating into the fish, FIGS. 3 to 8 show different processing steps performed on a cut made closely behind the gill cavity through the fish, whereby FIG. 3 shows the introduction of the liver strippers, FIG. 4 shows the moment after stripping of the ligaments supporting the liver, FIG. 5 shows a slightly later phase when thrust is applied from the exterior, FIG. 6 shows the insertion of the liver strippers provided with gullet grippers, FIG. 7 shows the clamping of the gullet, and FIG. 8 shows the phase after tearing out of the gullet and shearing off of the ligaments supporting the liver.

In the cross-section through the fish as shown in FIG. 3, the lower part of the belly cavity can be recognized which is bounded at the top by the spine 14 with the vertebrae appendages or processes attached thereto, the gullet 15 attached locally to the underside of the spine and two liver lobes 16 being disposed below the gullet and filling a substantial part of the cross-section of the belly cavity. The liver lobes are suspended from the side walls of the belly cavity by skin tissues and/or ligaments 17, for convenience referred to hereafter as ligaments. This cross-section corresponds to a cut through the fish carried out closely behind the gill cavity and is therefore disposed closely behind the diaphragm which closes off the belly cavity from the gill cavity.

For carrying out the method according to the invention the diaphragm of the fish which has either been cut in the throat region (or decapitated) is pierced from the gill cavity. Referring to FIG. 3 the penetration of a liver stripper 10 into the belly cavity is performed closely below the spine and on both sides of the gullet 15 in order to avoid damage to the liver. Movement of the liver stripper along the internal wall of the belly cavity in the direction of the underside of the belly enables the ligaments retaining the liver lobes to the belly cavity of the fish to be severed so that the liver can either drop out of the belly cavity or can be pulled out.

If the liver is more firmly anchored it is advantageous to perform the method in accordance with FIG. 5. By applying thrust from the exterior with thrust members 12, one on each side, the two belly flaps are gripped in the manner of tongs and the liver stripped out by movement of the tongs in the direction of the underside of the belly.

In a special adaptation of the method it is possible to process such fishes in which the gullet is grown respectively fixed to the bottom-side of the spine. Thus, referring to FIG. 6, after penetration into the belly cavity by stripper members having stripper surfaces 19 and gullet grippers 18 the gullet is first gripped in the manner of tongs by the gullet grippers 18 and while thrust is applied from the exterior by thrust members 12, shown in FIG. 8, the gullet is torn off from the spine in accordance with FIG. 8. At the same time the liver ligaments are severed. Removal of the liver lobes and of the gullet in fishes whose belly cavity is not longitudinally opened is also possible through the headside opening of the belly cavity while in those fish with a longitudinally-slit open belly cavity this is possible through the opening slit.

The method according to the invention may be carried out while the fish is maintained stationary and the tools are inserted into the belly cavity of the fish. It is however also possible for the process to be carried out by a continuously conveyed fish moved with its cavity against the tools.

The simplest means for performing the method is a fork but its application would be confined to fish of one size. Spreadable tongs alone are not always able to ensure reliable stripping of the liver. A combination of a tong-shaped liver remover and side thrust members represents a tool capable of meeting all technical requirements and also capable of processing all kinds of fish and sizes, the construction of the individual tool parts being as important as their precise relative layout.

A system which is particularly suitable for performing the method is illustrated in FIG. 1. A conveyor 1 provided with conveying members 4, such as rods, runs over two pulleys 2 and 3 which are mounted on a machine. The pulley 2 may be driven intermittently or continuously in known manner. Diagrammatically shown are two tools, of which the liver remover 7 functions actively and the thrust member 12 functions passively relatively to the fish. The tools are disposed below the upper run of the conveyor, a spreader 23, 24 being disposed generally between the two aforementioned tools and used for holding open the belly cavity.

The fish 5 with its gullet already cut bears with its gill cavity on a driver 4 and is guided by suitable means (not shown) and with its head 6 raised above the liver remover 7.

The construction of the aforementioned tools is illustrated in FIG. 2 (the tools being disposed in this case for clarity of illustration over a fish which is conveyed with its belly facing upwardly). A pair of shafts 8 which carry bosses of the two arms of the liver remover 7 are mounted on the machine. These arms have an L-shaped configuration and terminate at their ends in spikes disposed parallel to the shafts 8. The spikes have, disposed laterally on the inside thereof, the gullet grippers 18, and disposed in the angled region of the arms are obliquely extending and outwardly inclined liver stripper surfaces 19. The bosses on the shafts 8 are coupled by tooth segments 9 or the like so that their arms always take up a uniform position relatively to the plane of symmetry of the fish. Similar bosses of the thrust members 12 are also pivotable around shafts 11 which are mounted on the machine, the lower ends of said thrust members being provided with thrust surfaces 20 having rear edges 21, The bosses of the thrust members are also coupled to each other by toothed segments or the like (not shown) and are biased, for example by tension or compression springs 13. The spreader 23, 24 disposed between the liver stripper 10 and the thrust member 12 comprises two curved deflector plates. These are pivotable about a common vertical axis 22 disposed in the plane of symmetry of the fish perpendicularly to the conveying direction. The deflector plates are pulled towards each other by a tension spring 25 so that they are thrust against the stripper surfaces 19 to form shearing positions 26 therewith.

The means for spreading and closing the liver removers and thrust members are not shown but can incorporate cams rotating in synchronism with the drivers 4.

We claim:
1. A method for removing the liver from the belly cavity of a fish comprising engaging the liver lobes from behind, from the gill cavity, below the spine and on both sides of the gullet, and serving the ligaments supporting the liver lobes by stripping along the interior wall of the belly cavity.

2. A method according to claim 1 wherein a thrust is applied from the exterior to the belly lobes during the stripping operation.

3. A method according to claim 1 wherein the gullet is clampingly gripped and then torn out during severance of the ligaments which support the liver.

4. A method for removing the liver and/or the gullet from the belly cavity which is open in the zone of the gill cavity of a fish and in accordance with claim 1, wherein the stripping and tearing motion takes place in the direction of the gill cavity of the fish.

5. A method for removing the liver and/or the gullet from the belly cavity of a fish opened over its entire length and in accordance with claim 1 wherein the stripping and tearing motion takes place in the direction of the lower edge of the belly and of the tail end of the fish.

References Cited
UNITED STATES PATENTS
| | | | |
|---|---|---|---|
| 2,529,920 | 11/1950 | Danielsson | 17—58 |
| 3,187,376 | 6/1965 | Laws | 17—58 |

FOREIGN PATENTS
| | | | |
|---|---|---|---|
| 98,679 | 9/1961 | Norway | 17—58 |

LUCIE H. LAUDENSLAGER, Primary Examiner

U.S. Cl. X.R.

17—58